(12) United States Patent
Akiyama et al.

(10) Patent No.: US 11,872,779 B2
(45) Date of Patent: Jan. 16, 2024

(54) METHOD FOR PRODUCING COMPOSITE MATERIAL JOINED BODY

(71) Applicant: MITSUBISHI HEAVY INDUSTRIES, LTD., Tokyo (JP)

(72) Inventors: Hiromichi Akiyama, Tokyo (JP); Kiyoka Takagi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/625,970

(22) PCT Filed: May 26, 2020

(86) PCT No.: PCT/JP2020/020785
§ 371 (c)(1),
(2) Date: Jan. 10, 2022

(87) PCT Pub. No.: WO2021/010028
PCT Pub. Date: Jan. 21, 2021

(65) Prior Publication Data
US 2022/0242070 A1  Aug. 4, 2022

(30) Foreign Application Priority Data

Jul. 16, 2019  (JP) ................................. 2019-131067

(51) Int. Cl.
*B32B 41/00*  (2006.01)
*B29C 70/54*  (2006.01)
(Continued)

(52) U.S. Cl.
CPC .............. *B29C 70/54* (2013.01); *B29C 33/60* (2013.01); *B29C 70/30* (2013.01)

(58) Field of Classification Search
CPC ......... B29C 70/54; B29C 33/60; B29C 70/30; B29C 66/919; B29C 66/02;
(Continued)

(56) References Cited

U.S. PATENT DOCUMENTS

2009/0239018 A1  9/2009  Aijima
2013/0129957 A1  5/2013  Zhao et al.
(Continued)

FOREIGN PATENT DOCUMENTS

JP    H07-214680 A    8/1995
JP    2004-181969 A   7/2004
(Continued)

OTHER PUBLICATIONS

European Patent Office, "Extended European Search Report and Search Opinion for European Patent Application No. 20840246.1," Jul. 15, 2022.
(Continued)

*Primary Examiner* — Michael N Orlando
*Assistant Examiner* — Joshel Rivera
(74) *Attorney, Agent, or Firm* — Manabu Kanesaka; Benjamin Hauptman; Kenneth Berner

(57) ABSTRACT

A method of the invention produces a composite material conjugate in which a first composite material and a second composite material are adhered without using an adhesive, wherein a first prepreg laminate to which a release member is attached is cured to form the first composite material, the release member being made of a material that does not transfer silicone and fluorine to the first prepreg laminate, after detaching the release member from the first composite material, surface treatment that imparts polar functional groups to the surface of the first composite material to which the release member was bonded is carried out to activate the surface, a second prepreg laminate is placed directly on the (Continued)

activated surface of the first composite material, and the second prepreg laminate is cured to form a second composite material adhered to the first composite material.

4 Claims, 5 Drawing Sheets

(51) Int. Cl.
*B29C 33/60* (2006.01)
*B29C 70/30* (2006.01)

(58) Field of Classification Search
CPC ..... B29C 66/1122; B29C 66/45; B29C 66/71; B29C 66/7212; B29C 66/7373; B29C 66/73755; B29C 66/73941; B29C 59/10; B29C 59/14; B29C 59/16; B29C 37/0075; B29C 70/68; B29C 65/02; B29C 66/72141; B29C 66/73751
USPC .............. 156/60, 64, 350, 351, 378, 379
See application file for complete search history.

(56) References Cited

U.S. PATENT DOCUMENTS

| 2013/0280488 | A1* | 10/2013 | Flinn ...................... B32B 5/024 156/247 |
| 2014/0144568 | A1 | 5/2014 | MacAdams et al. |
| 2015/0056433 | A1 | 2/2015 | MacAdams et al. |
| 2016/0121591 | A1 | 5/2016 | MacAdams et al. |
| 2016/0214328 | A1 | 7/2016 | MacAdams et al. |
| 2016/0318214 | A1* | 11/2016 | Pinillos Martínez ...................... B29C 66/73753 |
| 2017/0066226 | A1 | 3/2017 | Zhao et al. |
| 2017/0190165 | A1 | 7/2017 | MacAdams et al. |
| 2017/0282446 | A1 | 10/2017 | Cavaliere et al. |
| 2018/0001572 | A1 | 1/2018 | MacAdams et al. |
| 2019/0263072 | A1 | 8/2019 | Macadams et al. |
| 2020/0055261 | A1 | 2/2020 | Nelson et al. |

FOREIGN PATENT DOCUMENTS

| JP | 2009-221390 A | 10/2009 | |
| JP | 2015-508346 A | 3/2015 | |
| JP | 2016-501145 A | 1/2016 | |
| JP | 2016-534868 A | 11/2016 | |
| JP | 2018-502753 A | 2/2018 | |
| WO | 2018/049099 A1 | 3/2018 | |
| WO | 2018/170330 A1 | 9/2018 | |
| WO | WO-2018170330 A1 * | 9/2018 | ............ B29C 65/02 |

OTHER PUBLICATIONS

Hiromichi Akiyama et al., "Atmospheric pressure plasma treatment for composites bonding," Mitsubishi Heavy Industries, LTD., Technical Review vol. 55 No. 2, Jun. 2018, New Technologies, 5 pages.
Hiromichi Akiyama et al., "Atmospheric Pressure Plasma Treatment for Composites Bonding," Proceedings of the 413th Composite Materials Symposium, Japan Society for Composite Materials, Sep. 13, 2018, 2 pages.
JK Kim et al., "Characteristics of plasma surface treated composite adhesive joints at high environmental temperature," Composite Structures, Jul. 2002, Elsevier Ltd GB, vol. 57, No. 1, pp. 37-46.
PCT/ISA/210, "International Search Report for PCT International Application No. PCT/JP2020/020785," dated Jul. 21, 2020.

* cited by examiner

METHOD FOR PRODUCING COMPOSITE MATERIAL JOINED BODY

RELATED APPLICATIONS

The present application is National Phase of International Application No. PCT/JP2020/020785 filed May 26, 2020, and claims priority from Japanese Application No. 2019-131067, filed Jul. 16, 2019, the disclosure of which is hereby incorporated by reference herein in its entirety.

TECHNICAL FIELD

The present invention relates to a method for producing a composite material joined body.

BACKGROUND ART

Since composite materials of fiber reinforced plastic (FRP), in particular, carbon fiber reinforced plastic (CFRP) are lightweight and have high strength, the composite materials are being increasingly applied to structures or the like of aerospace equipment.

As a method of joining composite materials together or a composite material and a metal, bolt joining in which members to be joined are fixed to each other with a bolt and a nut is known. However, in the bolt joining, bolt joint strength is low, and thus it is necessary to increase the plate thickness of the member to be joined. In a case where drilling, bolting, and sealing work are performed at many locations, assembly man-hours increase and the weight of a product increases.

Therefore, in the field of an aircraft, it is desired to apply bonding using an adhesive (adhesive bonding), in which a weight reduction is expected as compared with the bolt joining. In the joining of structural members of an aircraft, safe and reliable fixation is required. Therefore, in order to apply the adhesive bonding to the structural members of an aircraft, improvement in reliability becomes an issue.

As described in PTL 1, the composite material is formed by laminating and curing prepregs. A release material is used at the time of the fabricating. However, when the release material (components derived from an organosilicon compound of a release agent or a fluororesin of a release film) remains on the surface of the composite material, it can become a factor that interferes with the mechanism of adhesive bonding.

In PTL 1, the bonding is strengthened by integrating an adhesive into the member to be bonded by using a stepwise bonding process.

In general, a composite material which is a member to be bonded is subjected to bonding after a release material remaining on the surface of the composite material is removed by pre-bonding treatment to obtain a clean surface. The removal of the release material is performed by sanding with sandpaper, a peel ply method, or the like.

The peel ply method is a method in which a peel ply cloth (hereinafter referred to as a peel ply) is attached to the surface of a prepreg, the peel ply is peeled off after curing, and adhesion is then performed on a place where a clean surface appears.

For example, in an example of a skin-stringer structure of an aviation wing, a stringer (a first composite material) and a skin (a second composite material) are bonded together by procedure as shown in FIG. 5.

First, (S21) prepregs for a stringer are laminated, (S22) a peel ply is attached, (S23) the prepreg and the peel ply are covered with a bagging material, (S24) curing is performed by heating and pressurization, and (S25) the bagging material is removed (debagging) to form a stringer.

Next, (S26) the peel ply is peeled off (pre-bonding treatment), (S27) a film adhesive is applied to the stringer, (S28) the stringer with the film adhesive applied thereto is disposed on a laminated prepreg for a skin, (S29) the prepreg is covered with a bagging material, (S30) curing is performed by heating and pressurization, and (S31) the bagging material is removed to form a skin bonded to the stringer.

CITATION LIST

Patent Literature

[PTL 1] PCT Japanese Translation Patent Publication No. 2016-501145 (Claim 1, Paragraph [0002], and the like)

SUMMARY OF INVENTION

Technical Problem

Since an adhesive is expensive, it is desirable that it is not used. However, in a case where adhesion is performed by a method of the related art without using an adhesive, adhesive strength is lowered.

Sanding is expensive because it is performed manually, and the quality varies depending on the skill level of a worker, so that uniform treatment is difficult. In the sanding, there is a possibility that fibers may be damaged.

In the peel ply method, in a case where the peel-ply cannot be properly peeled off or the heating at the time of the fabricating of a composite material is excessive, there is a case where components due to the peel-ply (peel ply components) remain. The remaining peel ply components reduce the adhesive strength. When the peel ply is peeled off after curing, there is a risk that a base material (a member to be bonded) may be damaged and the strength of the base material may decrease.

The present disclosure has been made in view of such circumstances, and has an object to provide a method for stably producing a composite material joined body having adhesive strength comparable to that in a case of using an adhesive in a method of the related art, even in a case where an adhesive is not used.

Solution to Problem

In order to solve the above problems, a method for producing a composite material joined body according to the present disclosure adopts the following means.

According to the present disclosure, there is provided a method for producing a composite material joined body in which a first composite material and a second composite material are bonded together without using an adhesive, the method including: fabricating the first composite material by curing a first prepreg laminate to which a release member is attached, the release member being made of a material that does not transfer silicone and fluorine to the first prepreg laminate; peeling off the release member is peeled off from the first composite material, and then performing surface treatment for imparting a polar functional group to a surface of the first composite material, to which the release member has been attached, to activate the surface; and fabricating the second composite material bonded to the first composite material, by directly disposing a second prepreg laminate on the activated surface of the first composite material and curing the second prepreg laminate.

The surface treatment for imparting a polar functional group may be a process of imparting the polar functional group to the surface of the first composite material, such as plasma treatment, corona discharge treatment, or ultraviolet treatment.

When fabricating the first composite material, instead of a peel ply, the release member made of a material that does not contain silicone and fluorine is attached to the first prepreg laminate. Therefore, peel ply components are not left on the surface of the first composite material.

The release member is made of a material that does not transfer silicone and fluorine to a member to which the release member is attached (the first prepreg laminate). Therefore, even if the release member is peeled off after curing of the first prepreg, silicone and fluorine are not left on the surface of the first composite material. According to the present disclosure, by preventing components caused by the peel ply and the release member from being left on the first composite material, a decrease in the adhesive strength of the composite material joined body due to the components can be suppressed.

By carrying out the surface treatment for imparting a polar functional group, an active functional group which includes oxygen, for example, a hydroxyl group (OH), a carbonyl group (C=O), a carboxyl group (COOH), or the like, is produced on the surface of the first composite material. These functional groups hydrogen-bond with the matrix resin of the second prepreg laminate. In this way, an adhesive force stronger than the van der Waals force is exhibited, and thus the adhesive strength between the first composite material and the second composite material is improved.

When imparting the polar functional group in the surface treatment, oxygen radicals are generated on the surface of the first composite material. The oxygen radicals react with C and H of surface dirt (contaminants) such as oil or organic substances. In this way, the contaminants are removed from the surface of the first composite material as $CO_2$ or $H_2O$.

In the first composite material in which the active functional groups are produced, the surface free energy increases and the adhesive strength also increases. In this way, even if a small amount of contaminants remain, it is possible to compensate for a decrease in adhesive strength due to the contaminants.

Since the surface treatment for imparting a polar functional group can be automated, the surface can be stably cleaned regardless of the skill level of a worker, as compared with manual sanding.

In an aspect of the present disclosure, surface free energy of the activated surface of the first composite material is set to be more than 60 $mN/m^2$.

The surface free energy is set to be more than 60 $mN/m^2$, so that a composite material joined body having sufficient adhesive strength (fracture toughness value) can be obtained.

In an aspect of the present disclosure, the method for producing a composite material joined body may further include: attaching an absorber capable of absorbing contaminants to the surface of the first prepreg laminate; covering the first prepreg laminate with a packaging material from above the absorber; evacuating an inside of the packaging material and heating the first prepreg laminate at a temperature lower than a curing temperature of a first prepreg; removing the packaging material; peeling off the absorber; and attaching the release member to the surface of the first prepreg laminate, from which the absorber has been peeled off.

The absorber attached to the first prepreg laminate can absorb contaminants which are present on the surface of the first prepreg laminate. Here, the contaminants are silicone, fluorine, or oil derived from a release sheet used at the time of the production of a prepreg, organic substances which are not derived from a prepreg, or the like. In this way, before the release member is attached, the contaminants are removed from the surface of the prepreg laminate, so that a cleaner surface is obtained.

By evacuating and heating the prepreg laminate with the absorber attached thereto, the viscosity of the resin is reduced. Therefore, the contaminants such as fluorine, silicone, and resins containing them can be efficiently absorbed.

Since the absorber is peeled off before the first prepreg laminate is cured, the components (contaminants) caused by the absorber are not left on the surface of the first prepreg laminate.

Advantageous Effects of Invention

According to the present disclosure, a composite material joined body having adhesive strength comparable to that in a case of using an adhesive in a method of the related art, even in a case where an adhesive is not used, can be stably produced by adopting the release member made of a material that does not transfer silicone and fluorine, and the surface treatment for imparting a polar functional group.

DESCRIPTION OF EMBODIMENTS

Hereinafter, embodiments of a method for producing a composite material joined body according to the present disclosure will be described with reference to the drawings.

First Embodiment

In a method for producing a composite material joined body according to the present embodiment, a first composite material and a second composite material are bonded together by a cobond method. The "cobond method" is a technique for integrating and curing a formed article after curing and an uncured prepreg. In a general method of the related art, an adhesive film is inserted between the formed article and the prepreg. However, in the present embodiment, an adhesive is not inserted.

Figure 1:
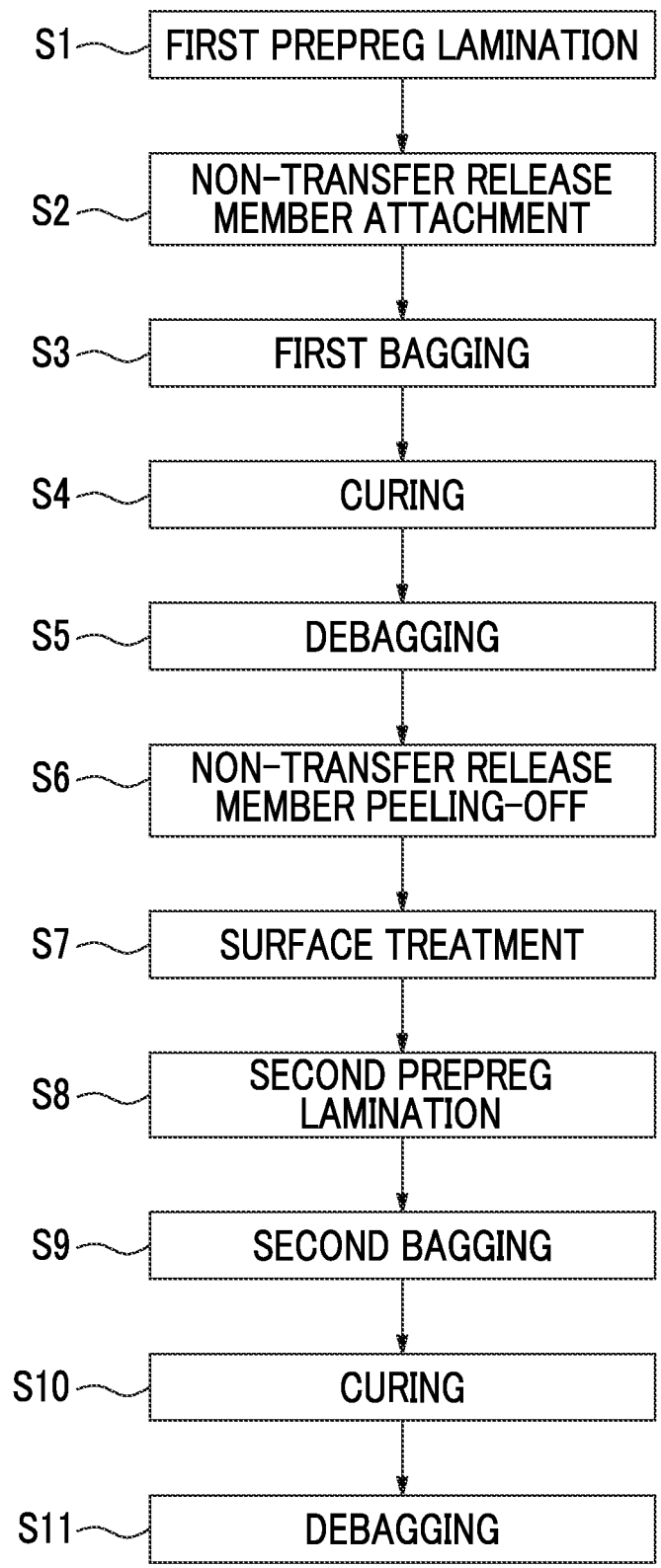
FIG. 1 is a diagram showing the procedure of a method for producing a composite material joined body according to a first embodiment.

FIG. 1 shows the procedure of the method for producing a composite material joined body according to the present embodiment.

In the present embodiment, first, (S1) a plurality of first prepregs are laminated to form a first prepreg laminate, (S2) a release member (a non-transfer release member) is attached to the first prepreg laminate, the release member being made of a material that does not transfer silicone and fluorine to the first prepreg laminate, (S3) the first prepreg laminate is covered with a first bagging material from above the release member, and (S4) the inside of the first bagging material is evacuated and the first prepreg laminate is heated and pressurized to cure a matrix resin of the first prepreg laminate, thereby fabricating a first composite material.

Next, (S5) the first bagging material is removed, (S6) the release member is peeled off from the first composite material, and then, (S7) surface treatment for imparting a polar functional group to the surface of a first composite material product with the release member attached thereto is performed to activate the surface.

In (S6), after the release member is peeled off, cleaning treatment may be performed on the surface of the first composite material, to which the release member has been attached, before the surface treatment for imparting a polar functional group is performed. In the cleaning treatment, contaminants stuck to the surface of the composite material after the release member is peeled off are removed. Solvent wipe, dry ice blast, or the like can be used for the cleaning treatment.

After the surface treatment, (S8) a second prepreg is directly laminated on the activated surface of the first composite material to form a second prepreg laminate (or second prepregs are laminated to form a second prepreg laminate and the activated surface of the first composite material is placed on the second prepreg laminate), (S9) the second prepreg laminate is covered with a second bagging material, and (S10) the inside of the second bagging material is evacuated and the second prepreg laminate is heated and pressurized to cure a matrix resin of the second prepreg laminate, thereby fabricating a second composite material.

(S11) the second bagging material is removed, so that a composite material joined body in which the second composite material is bonded to the first composite material without using an adhesive is obtained.

The "prepreg" is a sheet-like material in which a reinforcing fiber sheet is impregnated with a matrix resin. The reinforcing fiber sheet is a sheet in which a plurality of reinforcing fiber bundles are aligned in one direction, a woven fabric sheet of reinforcing fiber bundles, or a non-woven fabric sheet of reinforcing fiber bundles. The reinforcing fiber is a carbon fiber, a glass fiber, an aramid fiber, a silicon carbide fiber, or the like.

The matrix resin is thermosetting resin such as epoxy resin, phenol resin, benzoxazine resin, bismaleimide resin, cyanate ester resin, or unsaturated polyester resin. In the prepreg, the matrix resin is in a semi-cured state where it is uncured or is not completely cured, and has adhesiveness. The semi-cured state refers to a state where the matrix resin is not gelled and is sufficiently softened when it is heated again.

The prepreg may include a filler, a thermoplastic resin, a solvent, or the like in order to improve a function.

The first prepreg and the second prepreg may have the same configuration as the reinforcing fiber and the matrix, and may be different from the configurations of the reinforcing fiber and the matrix in a case where curing is not adversely affected and a heat resistant temperature is of no matter.

The release member is a release film, release paper coated with a release agent, a release woven fabric, or the like.

The release member is made of a material that does not transfer silicone and fluorine to a member to which the release member is attached. The material of the release member is polyolefin-based resin, a non-transfer silicone film, a non-transfer fluorine film, or the like. Here, the word "non-transfer" means that silicone and/or fluorine included in the film has a high molecular weight (molecular weight: 2000 or more), is firmly bonded, and does not perform a transition during prepreg curing. Many of substances which are transferred are derived from low molecular weight components.

The material that does not transfer silicone and fluorine may be a material that does not include silicone and fluorine. Here, the word "not include" means that silicone and fluorine are not included in a chemical composition of resin and that the resin is not intentionally added or applied to the release member. The word "not include" means that inevitably mixed silicone and fluorine (<1%) are allowed.

The first bagging material is a member that covers the first prepreg laminate and can hermetically seal the first prepreg laminate. The material of the first bagging material is nylon, PVC, polyolefin, fluororesin, or the like.

The second bagging material is a member that covers the second prepreg laminate and can hermetically seal the second prepreg laminate. The material of the second bagging material is nylon, PVC, polyolefin, fluororesin, or the like. The material of the second bagging material may be the same as or different from that of the first bagging material.

The curing and fabricating of the first prepreg laminate and the second prepreg laminate can be carried out by an autoclave method. The curing is not limited to the autoclave method, and may be carried out by other well-known composite material curing and fabricating methods, for example, a vacuum fabricating method, an RTM (Resin Transfer Molding) method, a VaRTM (Vacuum assisted Resin Transfer Molding) method, a press curing method, or the like.

The surface treatment for imparting a polar functional group activates the surface of the first composite material. The surface treatment for imparting a polar functional group is plasma treatment, corona discharge treatment, ultraviolet treatment, or the like. In the plasma treatment, the surface of the first composite material (the surface to which the release member has been attached) is irradiated with plasma by an atmospheric pressure plasma treatment device or the like. In the case of the corona discharge treatment, the surface of the first composite material (the surface to which the release member has been attached) is subjected to corona discharge irradiation by a corona discharge surface treatment device or the like. In the ultraviolet treatment, the surface of the first composite material is irradiated with ultraviolet rays having a wavelength in the range of 10 nm to 400 nm by an ultraviolet irradiation device.

Here, the "activation" means increasing surface free energy. The "surface free energy" is excess energy that surface molecules have, and the larger the value, the greater the force that contributes to adhesion.

The surface treatment for imparting a polar functional group may be carried out such that the surface free energy of the first composite material exceeds 60 $mN/m^2$. The surface free energy of a general composite material that is not subjected to the surface treatment for imparting a polar functional group is in the range of 30 $mN/m^2$ to 50 $mN/m^2$.

A second release member may be disposed between the second prepreg laminate and the second bagging material. The second release member may be made of the same material as a first release member, and may be a release film transferring fluorine or silicone, which has been used in the related art, or the like. In a case where the second release member is made of the same material as the first release member, it can be used at the time of bonding to other parts, or in a case of painting the inside.

According to the above embodiment, when fabricating the first composite material, instead of a peel ply, the release member (non-transfer release member) made of a material that does not transfer silicone and fluorine is attached to the first prepreg laminate. Therefore, peel ply components are not left on the surface of the first composite material.

Since the non-transfer release member does not transfer silicone and fluorine, even if it is peeled off after the curing of the first prepreg, silicone and fluorine are not left on the surface of the first composite material. According to the present disclosure, by preventing components caused by the peel ply and the release member from being left on the first composite material, a decrease in the adhesive strength of the composite material joined body due to the components can be suppressed.

By carrying out the surface treatment for imparting a polar functional group, such as the plasma treatment or the corona discharge treatment, an active functional group that includes oxygen, for example, a hydroxyl group (OH), a carbonyl group (C=O), a carboxyl group (COOH), or the like, is produced on the surface of the first composite material. These functional groups hydrogen-bond with the matrix resin of the second prepreg laminate. In this way, an adhesive force stronger than the van der Waals force is exhibited, and thus the adhesive strength between the first composite material and the second composite material is improved.

When imparting the polar functional group, oxygen radicals are generated on the surface of the first composite material. The oxygen radicals react with C and H of surface dirt (contaminants) such as oil or organic substances. In this way, the contaminants are removed from the surface of the first composite material as $CO_2$ or $H_2O$.

In the first composite material in which the active functional groups are produced, the surface free energy increases and the adhesive strength also increases. In this way, even if a small amount of contaminants remain, it is possible to compensate for a decrease in adhesive strength due to the contaminants.

The plasma treatment or the corona discharge treatment, which is the surface treatment for imparting a polar functional group, can more stably clean the surface, as compared with sanding.

(Adhesive Strength of Composite Material Joined Body)

A DCB (Double Cantilever Beam) test was performed on specimens 1 to 4. A mode I fracture toughness value ($G_{IC}$) was calculated by an area method.

Specimen 1: release film, with plasma treatment, no adhesive insertion

Specimen 2: peel ply, no plasma treatment, no adhesive insertion

Specimen 3: peel ply, no plasma treatment, with adhesive insertion

Specimen 4: base material (a first prepreg laminate and a second prepreg laminate are cured at the same time), no adhesive insertion <Specimen 1>

A composite material joined body was produced according to the above embodiment. A unidirectional carbon fiber and epoxy resin prepreg was used for each of the first prepreg and the second prepreg. A polyolefin-based release film was used for the release member. Fabricating was carried out by an autoclave method (180° C./2H). The surface of the first composite material, to which the release member has been attached, was subjected to the plasma treatment by an atmospheric pressure plasma treatment device (FPE20 Type 2, manufactured by Fuji Co., Ltd.). The plasma treatment was carried out under the condition that the surface free energy after the plasma treatment was 60 $mN/m^2$ or more.

<Specimen 2>

A composite material joined body was produced in the same manner as that in the specimen 1 except that the release member was replaced with a polyester peel ply (Peel ply 60001, manufactured by Solvay) and the plasma treatment was not performed.

<Specimen 3>

A composite material joined body was produced in the same manner as that in the specimen 1 except that the release member was replaced with a polyester peel ply (Peel ply 60001, manufactured by Solvay), the plasma treatment was not carried out, and an epoxy-based film adhesive (FM300-2M, manufactured by Solvay) was inserted between the first composite material and the second composite material.

<Specimen 4>

A composite material joined body was produced by a cocure method instead of the cobond method. The configurations of the first prepreg laminate and the second prepreg laminate and the fabricating thereof were the same as those in the specimen 1. An adhesive was not inserted between the first composite material and the second composite material.

Figure 2:
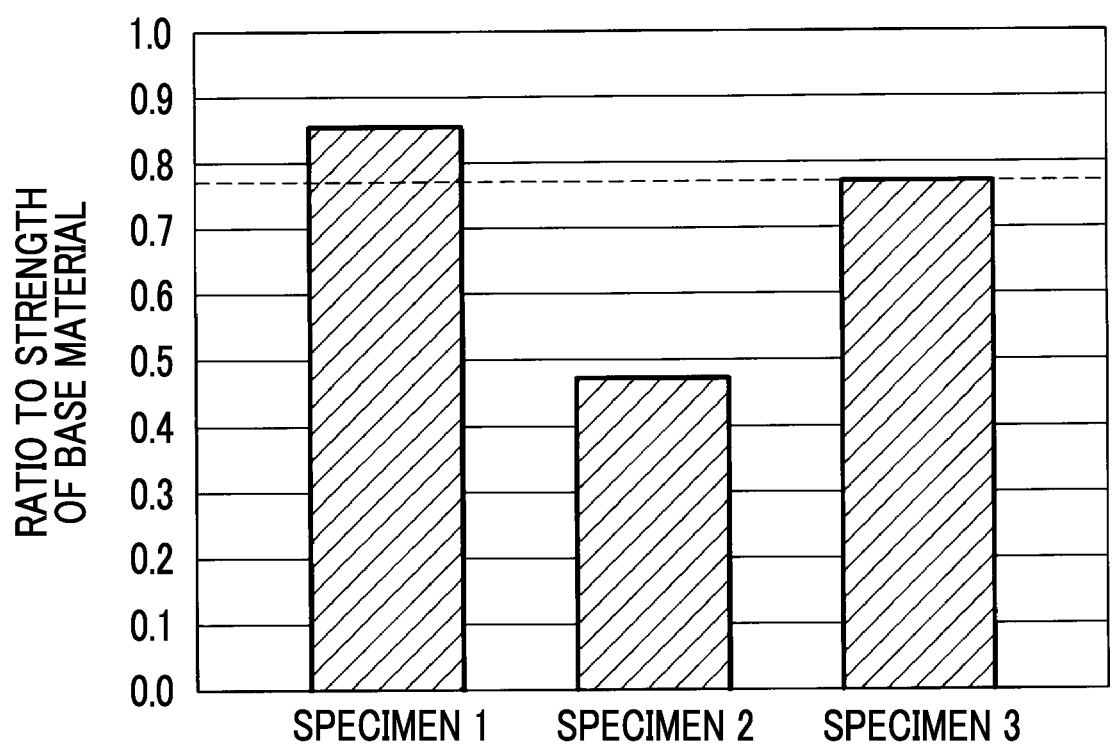
FIG. 2 is a diagram showing the results of a DCB test.

FIG. 2 shows the results of the DCB test. The vertical axis of FIG. 2 is the ratio to the strength of the base material. The ratio to the strength of the base material ($G_{IC}$ ratio) was calculated by dividing the $G_{IC}$ of the specimens 1 to 3 by the $G_{IC}$ of the specimen 4 (the base material). The broken line in FIG. 2 is the $G_{IC}$ ratio of the specimen 3. The $G_{IC}$ of the base material was around 1 $kJ/m^2$.

According to FIG. 2, the strength of the specimen 2 was less than 50% of the strength of the specimen 4 (the base material). The strength of the specimen 3 was about 78% of the strength of the base material. The use of the adhesive (the specimen 3) improved the strength, as compared with a case where an adhesive was not used (the specimen 2). However, the strength did not reach the strength of the base material.

According to FIG. 2, the strength of the specimen 1 in which the release member was used was 85% of the strength of the base material. From this result, it was confirmed that the adhesive strength in the composite material joined body was improved by using the release member made of a material that does not transfer silicone and fluorine.

The strength of the specimen 1 was equal to or higher than that of the specimen 3 in which an adhesive was used. This result suggests that the use of an adhesive can be omitted due to adopting the release member made of a material that does not transfer silicone and fluorine and the surface treatment for imparting a polar functional group.

Second Embodiment

Figure 3:
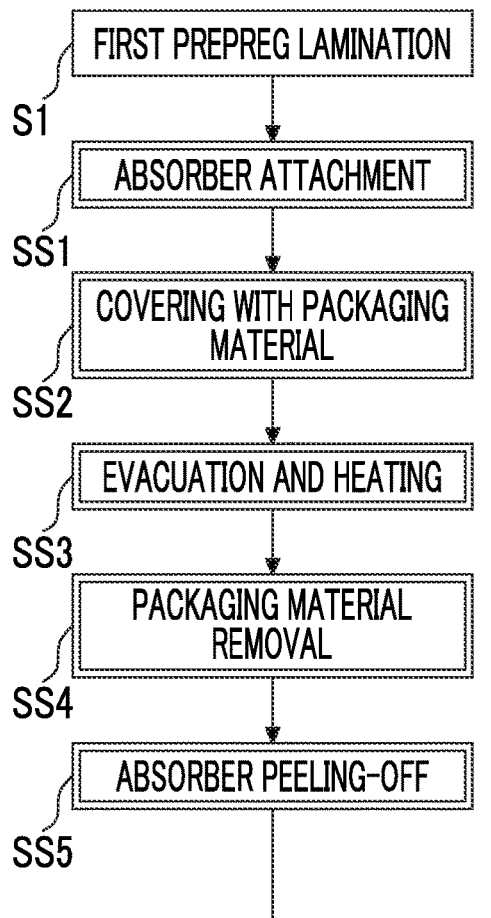
FIG. 3 is a diagram showing the procedure of a method for producing a composite material joined body according to a second embodiment.
Figure 3:
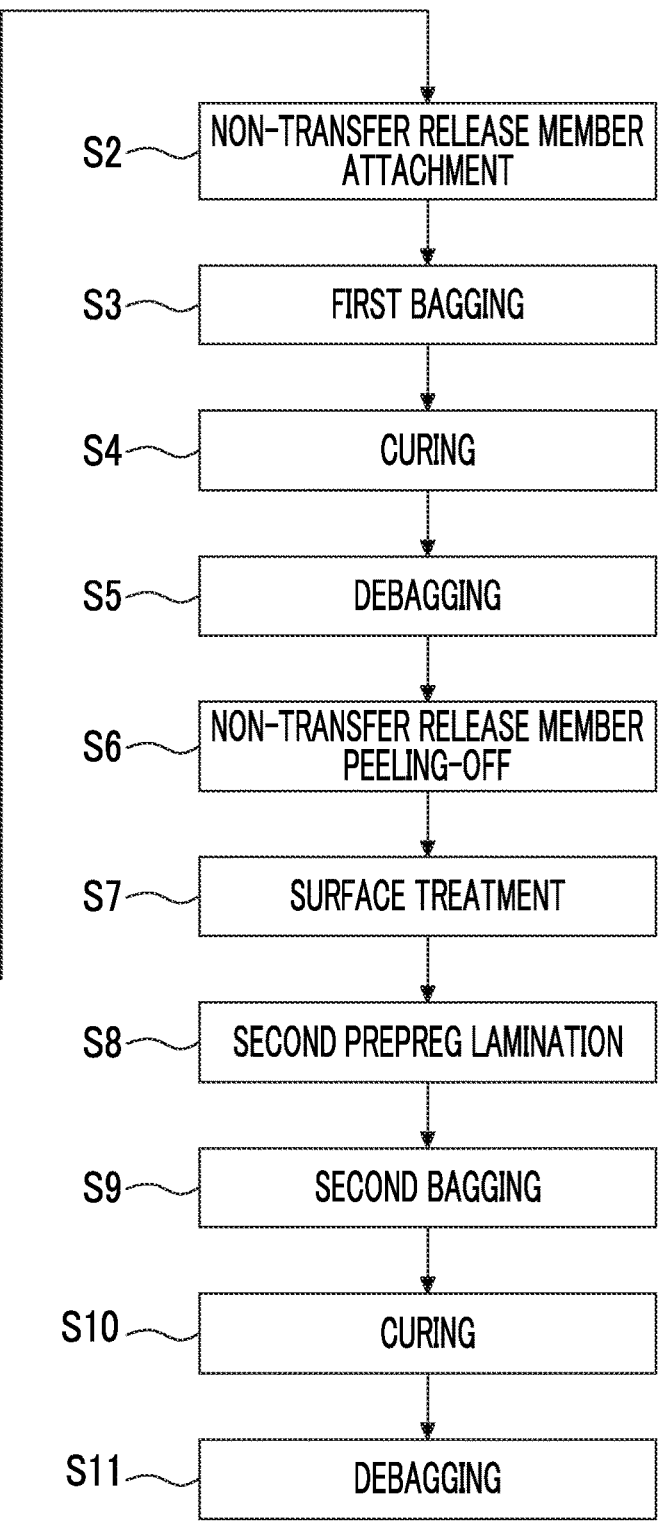

FIG. 3 shows the procedure of a method for producing a composite material joined body according to the present embodiment. The method for producing a composite material joined body according to the present embodiment includes the steps of (S1) to (S11) as in the first embodiment. The method for producing a composite material joined body according to the present embodiment further includes steps (SS1) to (SS5) of removing contaminants on the surface of the first prepreg laminate, between (S1) and (S2). Since (S1), and (S3) to (S11) are the same as those in the first embodiment, the description thereof will be omitted.

The steps of removing contaminants include (SS1) to (SS5).

In the steps of removing contaminants, (SS1) an absorber capable of absorbing contaminants is attached to the surface of the first prepreg laminate, (SS2) the first prepreg laminate is covered with a packaging material from above the absorber, (SS3) the inside of the packaging material is evacuated and the first prepreg laminate is heated at a temperature lower than the curing temperature of the first prepreg, and then, (SS4) the packaging material is removed, and (SS5) the absorber is peeled off.

After the absorber is peeled off, (S2) the release member is attached to the surface of the first prepreg laminate, from which the absorber has been peeled off.

The contaminants are silicone, fluorine, and oil derived from the release member (a release film, a release agent, or the like) used at the time of the production of the prepreg, organic substances not derived from the prepreg material, or the like.

The absorber is a substance that is used in the prepreg laminating process and can be peeled off after it absorbs the resin. More specifically, the absorber is a cloth, a woven fabric, a non-woven fabric, a porous body, or the like. For example, a peel ply made of polyester resin can be used as the absorber.

The packaging material is a member that simply covers the first prepreg laminate and can hermetically seal the first prepreg laminate. The material of the packaging material is nylon, PVC, polyolefin, fluororesin or the like. The material of the packaging material may be the same as or different from the first bagging material or the second bagging material.

The evacuation and the heating in (SS3) are carried out under the condition that the first prepreg laminate is not cured. For example, in the case of a laminate using a prepreg made of a 180° C. curable epoxy resin, by performing evacuation and heating at 70° C. for about 10 minutes, fluorine, silicone, or a resin containing them left on the surface can be absorbed and removed by the absorber without curing the prepreg.

The absorber is peeled off from the first prepreg laminate before the first prepreg laminate is cured. In this way, components derived from the absorber (for example, polyester components) can be prevented from remaining on the surface of the first prepreg laminate. For example, the element ratio of silicone on the surface (adhesion-planned surface) of the first prepreg laminate, from which the absorber has been peeled off, may be set to be 1% or less.

Here, the words "not cured" and "before curing" mean that a curing reaction does not proceed, or that although a curing reaction proceeds, resin is not gelled.

Figure 4:
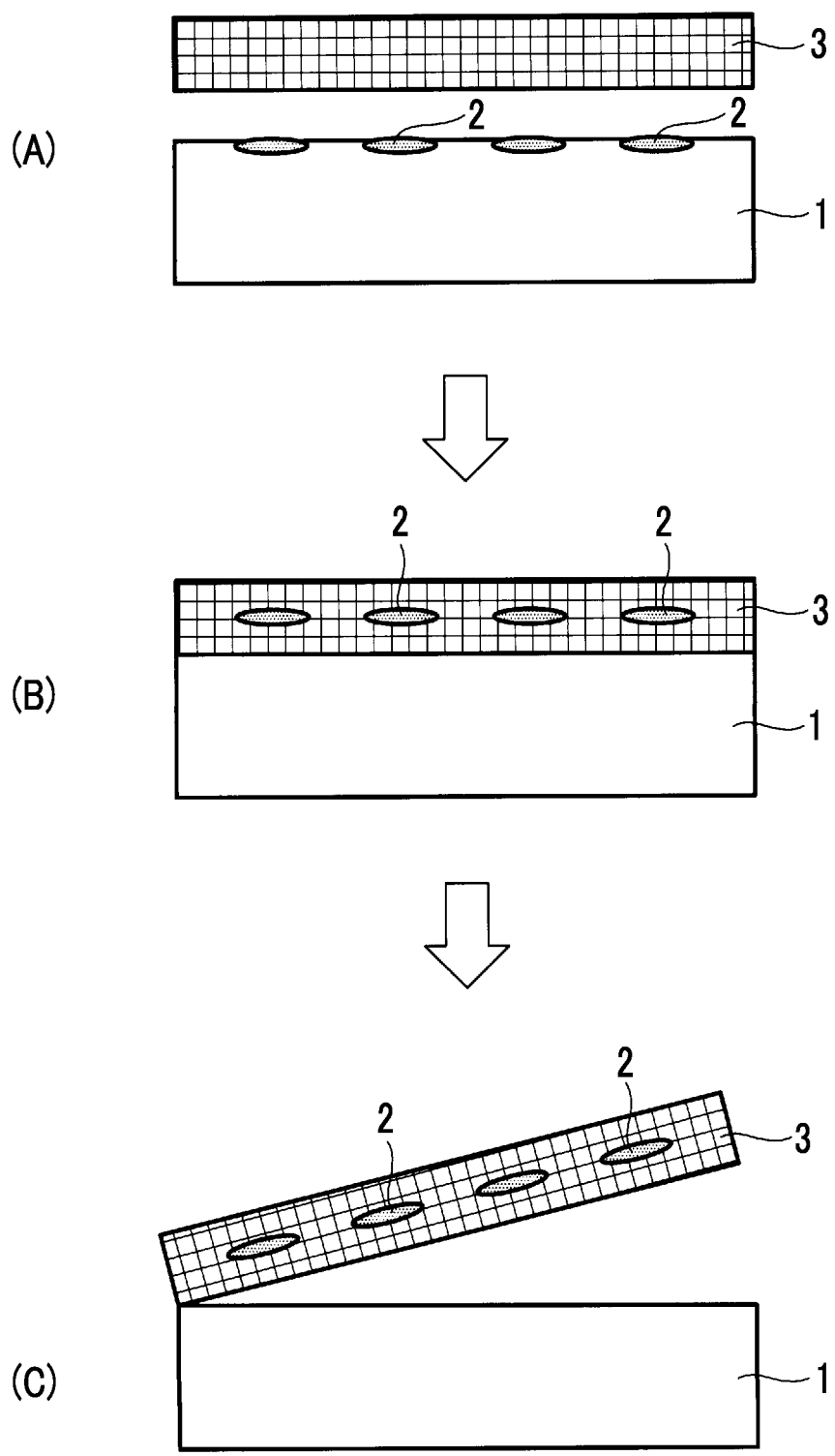
FIGS. 4(A), 4(B) and 4(C) are schematic diagrams describing the action and effect of an absorber.
Figure 5:
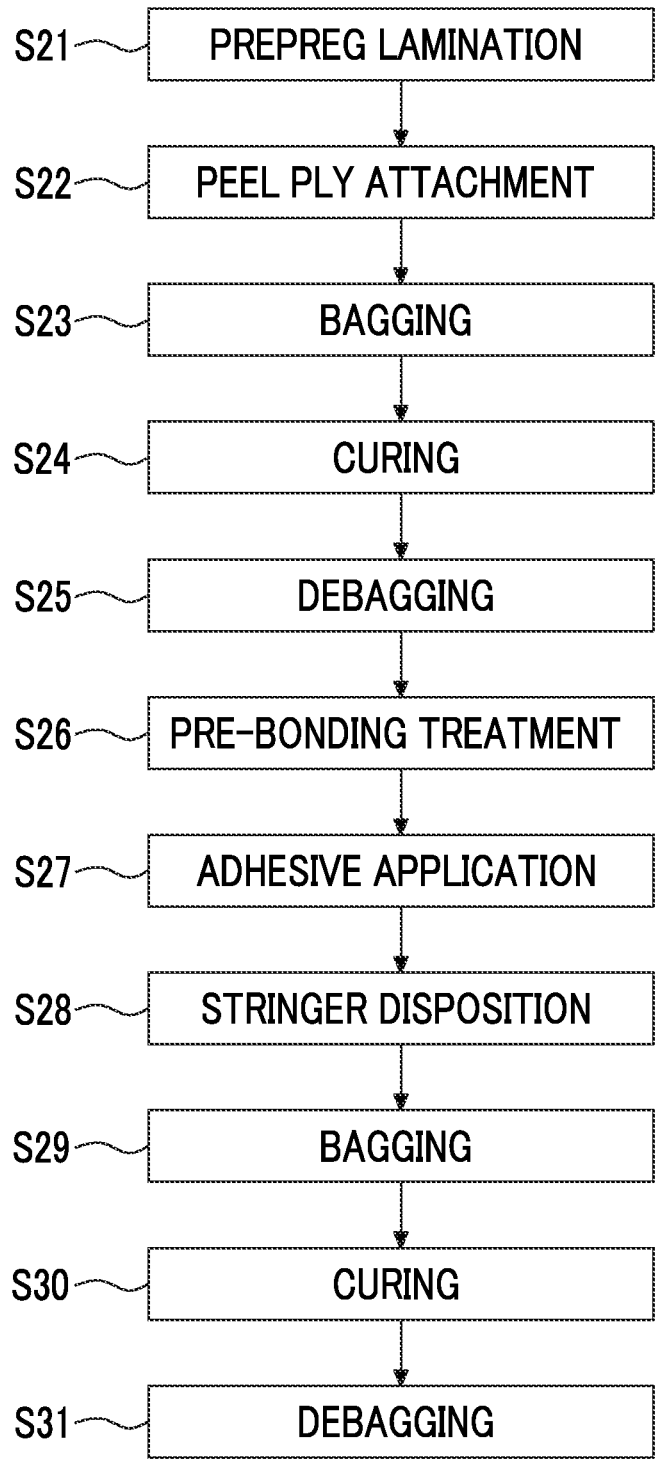
FIG. 5 is a diagram showing the procedure of a method for producing a composite material joined body in a method of the related art.

The action and effect of the absorber will be described with reference to FIGS. 4(A) to 4(C).

There is a case where contaminants 2 are present on the surface of a prepreg 1. By attaching an absorber 3 to such a surface (FIG. 4(A)) and performing evacuation, the contaminants 2 or the matrix resin that includes the contaminants 2 permeates into the absorber 3 (FIG. 4(B)). Here, when heating is also used together, the matrix resin of the prepreg 1 is softened, so that the contaminants 2 can efficiently permeate into the absorber 3 (FIG. 4(B)). Thereafter, by peeling off the absorber 3, the contaminants 2 are removed from the surface of the prepreg 1 (FIG. 4(C)).

The heating is carried out at a temperature lower than the curing temperature of the matrix resin. Therefore, since the absorber 3 is peeled off before the matrix resin is cured, the components derived from the absorber 3 are not left on the surface of the prepreg 1.

REFERENCE SIGNS LIST

1: prepreg
2: contaminant
3: absorber

The invention claimed is:

1. A method for producing a composite material joined body in which a first composite material and a second composite material are bonded together without using an adhesive, the method comprising:
fabricating the first composite material by completely curing a first prepreg laminate to which a release member is attached, the release member being made of a material that does not transfer silicone and fluorine to the first prepreg laminate;
peeling off the release member from the first composite material, and then performing surface treatment for imparting a polar functional group to a surface of the first composite material, to which the release member has been attached, to activate the surface; and
fabricating the second composite material bonded to the first composite material, by directly disposing a second prepreg laminate on the activated surface of the first composite material and curing the second prepreg laminate.

2. The method for producing a composite material joined body according to claim 1, wherein the surface treatment is a process of imparting the polar functional group to the surface of the first composite material, and includes plasma treatment, corona discharge treatment, or ultraviolet treatment.

3. The method for producing a composite material joined body according to claim 1, wherein surface free energy of the activated surface of the first composite material is set to be more than 60 mN/m$^2$.

4. The method for producing a composite material joined body according to claim 1, further comprising:
attaching an absorber capable of absorbing contaminants to the surface of the first prepreg laminate;
covering the first prepreg laminate with a packaging material from above the absorber;
evacuating an inside of the packaging material and heating the first prepreg laminate at a temperature lower than a curing temperature of a first prepreg;
removing the packaging material;
peeling off the absorber; and
attaching the release member to the surface of the first prepreg laminate, from which the absorber has been peeled off.

* * * * *